Patented May 8, 1951

2,552,323

UNITED STATES PATENT OFFICE 2,552,323

PROCESS OF DRYING HYDROGEL MICROSPHERES

Charles N. Kimberlin, Jr., Baton Rouge, La., assignor to Standard Oil Development Company, a corporation of Delaware No Drawing. Application February 11, 1949, Serial No. 75,945

4 Claims. (Cl. 252—448)

This invention relates to a process for the preparation of catalytic or adsorptive materials, and more particularly to the preparation of hydrogel microspheres.

Inorganic gels are well-known and have long been used for various purposes, for example, for the adsorption of condensible vapors from gaseous carriers and for catalytic purposes, either as the catalyst itself, or as a component thereof, or as a carrier.

Such gels have been found to be particularly useful as a catalyst for carrying out reactions involving hydrocarbons and particularly in the so-called fluid catalyst process in which the catalyst is in a finely divided form and is aerated or fluidized by means of a gas so that it behaves similar to a liquid exhibiting properties such as fluid flow, hydrostatic pressure and the like. The hydrostatic property of these powdered catalysts is particularly useful in circulating the catalyst through the system.

These powdered materials are generally prepared by grinding silica gel or other types of gels to desired size. It has been recently found that catalysts having a particle size within the desired range for the fluid catalyst procedure, that is between 20 and 200 microns, can be prepared by causing a sol of the desired gel forming substance to set while dispersed in a water-immiscible liquid, such as oil, or a partially water-miscible liquid, such as butanol, whereby small spherical particles having diameters less than one millimeter are obtained. The microspheres thus obtained are washed and dried, usually in air, and then heated to a temperature between 850° F. and 1200° F. for purposes of activation. However, during the drying step, it has been observed that these small spheres tend to agglomerate into masses. The particles lose their identity as individual spheres to such an extent that the advantage of the spherical form is lost.

The object of this invention is to provide a method whereby hydrogel microspheres may be dried without loss of the spheroidal identity of each particle and without any substantial agglomeration.

The process which comprises the subject of this invention involves the adaptation of a freezing and thawing technique. It is recognized that freezing and thawing technique is old in the art of catalyst manufacture. Schorger, 1,949,360; Sturgeon 2,315,024; 2,344,330; and 2,278,223, discloses the freezing and thawing of catalytic materials. In these patents the generally expected results are sought and obtained, that is, the catalytic mass upon thawing after being frozen has been converted to a powdered or granular state. Gel structure is lost, gel capillaries burst, and complete disintegration of particle coherence results.

In this invention, however, the freezing and thawing technique is adapted to a process for the manufacture of catalytic material in such fashion that results directly opposite to those expected are obtained. Using the process of this invention, as hereinafter described, the catalytic materials maintain their particle identity substantially completely; the gel structure and capillary area remain unimpaired; the surface of the gel becomes more firm and interparticle cohesion is substantially completely eliminated.

The hydrogel microspheres may be formed in any of the processes known in the art. For example, silica hydrosol as prepared by mixing a solution of sodium silicate with an acidic solution such as sulfuric acid. Once the hydrosol is formed, it may be emulsified by agitation with a water-immiscible liquid such as oil, or a partially water-miscible liquid, such as butanol, the agitation continuing until the particles are solidified or set to hydrogel particles. The hydrosol may be injected into the top of a column of a water-immiscible liquid such as oil, or a partially water miscible liquid, such as butanol, as a plurality of streams of droplets, the droplets of hydrosol setting to hydrogel particles as they sink through the water-immiscible liquid column.

The hydrogel microspheres so formed are separated from their suspending medium and washed with water to remove soluble salts. After washing, enough water is added to the particles to form a slurry of hydrogel microspheres in water consisting of about 50% hydrogel and 50% water.

According to this invention, the temperature of the slurry of hydrogel microspheres in water is rapidly lowered to below the freezing point of water. The frozen slurry of water and hydrogel microspheres is then thawed and filtered to remove excess water. Drying and activation then is carried out in the usual manner, such as heating in an oven to 250° F. for drying and then activating by heating to about 850° F.

The rapid freezing of the water slurry of the hydrogel microspheres may be accomplished by pouring the water slurry into a water-immiscible substance such as kerosene that is maintained at a temperature within a range of 0° F. to 25° F. Although kerosene is preferred any other liquid which is non-reactive chemically with the gel and which is non-miscible or only slightly miscible with water and which does not freeze at the temperature of the operation may be used. Examples of other liquids which will satisfy these conditions are naphtha, gas oil, light lubricating oil, carbon tetrachloride, ether, chlorobenzene, etc. The total freezing time of the water slurry of the hydrogel microspheres should be less than 60 minutes, preferably less than 10 minutes. The water slurry of the microspheres may be frozen by subjecting the slurry to extremely low temperatures for a short period of time, such as in a refrigeration zone maintained at a temperature within a range of from $-80°$ F. to $+10°$ F., preferably $-40$ to $0°$ F. The residence time of the water slurry of microspheres in the refrigeration zone should not exceed 10 to 20 minutes and is preferably less than 10 minutes. Solid carbon dioxide or dry ice may be used as a refrigerant in said refrigeration zone, though other refrigerants may be used. If it is desired, coils containing ammonia or similar refrigerant such as propane, carbon dioxide, methyl chloride, sulfur dioxide, dichlorodifluoromethane may be used. In this case it would be desired to circulate the kerosene (or other heat transfer medium) over the coils and into the zone wherein the hydrogel freezing takes place. While the exact explanation of the reason why this freezing action causes the microspheres to preserve their identity and to resist agglomeration is unknown, the following theory is advanced:

Each particle of hydrogel is surrounded by a film of water which rapidly changes to ice. The particle is thus segregated from all other particles by the ice and there is no opportunity for two or more of the particles to contact each other and form a mass, each particle being preserved in its own identity. As the water surrounding each particle freezes, it expands, subjecting each individual particle to a squeezing action. This squeezing action forces out of the particle some of its water content and causes it to shrink in diameter. The squeezing action also causes the outer surface to harden to some extent. This hardening action aids in the continued preservation of the particles' identity.

The microspheres thus formed are found to be completely free of agglomeration. The individual particles are found to be perfect microspheres and suffer no damage as to their shape during the freezing operation.

The invention may be further described and explained by the following examples:

Example 1

A hydrosol was prepared by mixing 2 volumes of sodium silicate ($Na_2O.3.25.SiO_2$) solution of specific gravity 1.21 with 1 volume of sulfuric acid, specific gravity 1.19, and 1 volume of aluminum sulfate solution, specific gravity, 1.31. This hydrosol was suspended by means of agitation in 5 times its volume of SAE 10 lubricating oil containing a small amount of a high molecular weight amine as an emulsifying agent. The suspension was maintained at 160° F. until the hydrosol had set to a hydrogel. After setting, anhydrous ammonia was introduced into the suspension to precipitate the alumina within the hydrogel. The hydrogel was then removed from the oil and washed with water until free of soluble salts. Separate portions of the hydrogel microspheres were then dried as described in the following examples.

Example 2

A slurry of hydrogel microspheres in water as prepared in Example 1 was filtered to remove the excess water. The filter cake was then dried in a steam heated oven. The dried product consisted of large lumps of agglomerated material which could not be broken down to small particle size without destroying the microspherical shape of the original hydrogel.

Example 3

Hydrogel microspheres were prepared as in Example 1. After washing the hydrogel particles in water, a slurry of hydrogel remained. This slurry was concentrated to 50% hydrogel by filtering. The concentrated slurry, which was at a temperature of 80° F., was poured with stirring into a vessel containing kerosene which was maintained at a temperature of approximately 20° F. When the slurry of the hydrogel was completely frozen which took about 10 minutes, kerosene was then decanted from the frozen slurry. This frozen slurry appeared as a translucent cake in which the individual microspheres were imbedded. The frozen slurry was then thawed and filtered to remove excess water. The filter cake was dried in a steam heated oven. The product was completely free of agglomeration. Upon examination under a microscope, it was seen that the individual particles were perfect spheres indicating that the particles had suffered no damage by freezing.

Example 4

A slurry of hydrogel microspheres as prepared in Example 1 was filtered to remove water. The filter cake was placed in a dry ice chest until frozen, the freezing being completed in less than 60 minutes. The frozen hydrogel which somewhat resembled snow with the individual microspheres imbedded therein was then removed from the dry ice chest and thawed. Upon thawing, it was observed that the freezing had caused the gel to shrink considerably so that a large amount of water had been squeezed out of the gel structure. The mixture was filtered to remove this water and the filter cake was dried in a steam heated oven. The product was entirely free of agglomeration. Upon examination under a microscope, it was seen that the individual particles were perfect spheres indicating that no damage had been done to the particles by freezing.

Example 5

A silica hydrosol was made by adding sodium silicate ($Na_2O.3.25\ SiO_2$) solution, specific gravity 1.21 to an equal volume of sulfuric acid, specific gravity 1.19. This hydrosol was suspended by means of agitation in 5 times its volume of SAE 10 lubricating oil containing a small amount of a high molecular weight amine as an emulsifying agent. The suspension was maintained at 160° F. until the hydrosol set to a hydrogel. The hydrogel was then removed from the oil and washed with water until free of soluble salts, the water slurry of the hydrogel remaining. This slurry was concentrated to 50% hydrogel by filtering. The concentrated slurry, which was at a temperature of 80° F., was poured with stirring into a vessel containing kerosene which was maintained at a temperature of approximately 20° F. when the slurry of the hydrogel was completely frozen which took about 10 minutes, kerosene was then decanted from the frozen slurry. This frozen slurry appeared as a translucent cake in which the individual microspheres were imbedded. The frozen slurry was then thawed and filtered to remove excess water. The filter cake was dried in a steam heated oven. The product was completely free of agglomeration. Upon examination under a microscope, it was seen that the individual particles were perfect spheres indicating that the particles had suffered no damage by freezing.

Having described the preferred embodiment of the invention, it will be understood that it embraces such other variations and modifications as come within the spirit and scope thereof.

What is claimed is:

1. A process for producing a gel powder consisting essentially of spherical particles below 1 millimeter in diameter and adapted for use in processes involving the suspension of powdered gel particles in a gaseous stream which comprises forming a hydrosol of the desired gel forming material, emulsifying said sol in a water immiscible liquid as a dispersed phase of fine hydrosol droplets capable of forming particles of a diameter specified, maintaining said emulsion until the sol droplets set into hydrogel, separating the hydrogel droplets from the emulsion, first freezing and thereafter thawing said droplets to remove a large portion of the water therefrom without effecting any substantial agglomeration of the individual hydrogel particles into larger masses and thereafter further drying said material to form a dry gel powder of the character mentioned without the necessity of further molding, extruding or grinding.

2. In the process defined in claim 1 the further improvement which comprises suspending the hydrogel droplets following separation from the emulsion and before said freezing and thawing treatment in water to form a concentrated hydrogel water slurry and subjecting said slurry to said freezing and thawing treatment.

3. In a process for preparing a gel catalyst capable of use in oil conversion processes using powdered catalyst suspended in the oil vapors to be converted comprising spherically shaped particles below 1 millimeter in diameter wherein a hydrosol containing the desired catalytic components is emulsified in a water immiscible liquid as a dispersed phase of fine droplets capable of forming spherical particles of the required diameter, the resulting emulsion maintained until the hydrosol sets into a hydrogel and the resulting hydrogel droplets separated from the emulsion is thereafter washed, dried and activated, the method of avoiding substantial agglomeration of the hydrogel particles during the drying treatment which comprises first freezing and thereafter thawing the hydrogel droplets separated from the emulsion to remove a substantial amount of water contained therein and thereafter subjecting the partially dried particles to further drying treatment.

4. In the process defined in claim 3 wherein the hydrosol is formed by combining sodium silicate, sulfuric acid and aluminum sulfate, wherein the hydrogel droplets are treated with ammonia to decompose the aluminum sulfate, the resulting product washed free of soluble salts prior to the freezing and thawing treatment.

CHARLES N. KIMBERLIN, Jr.

REFERENCES CITED

The following references are of record in the file of this patent:

UNITED STATES PATENTS

| Number | Name | Date |
| --- | --- | --- |
| 2,278,223 | Sturgeon | Mar. 31, 1941 |
| 2,315,024 | Sturgeon | Mar. 30, 1943 |
| 2,344,330 | Sturgeon | Mar. 14, 1944 |
| 2,480,669 | Payne et al. | Aug. 30, 1949 |